(12) United States Patent
Kage et al.

(10) Patent No.: US 6,597,651 B1
(45) Date of Patent: Jul. 22, 2003

(54) DISC PLAYER

(75) Inventors: Shingo Kage, Hyogo (JP); Yasunari Toyama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/719,227

(22) PCT Filed: Apr. 10, 2000

(86) PCT No.: PCT/JP00/12340
§ 371 (c)(1),
(2), (4) Date: Dec. 11, 2000

(87) PCT Pub. No.: WO00/62288
PCT Pub. Date: Oct. 19, 2000

(30) Foreign Application Priority Data

Apr. 12, 1999 (JP) ............................................ 11-103540

(51) Int. Cl.[7] ................................................ G11B 17/04
(52) U.S. Cl. ...................................................... 369/77.1
(58) Field of Search ............................... 369/77.1, 77.2, 369/75.1, 75.2, 191, 192, 193, 194, 30.94, 178.01, 179, 30.67, 30.7, 30.72, 30.75, 30.78, 30.85, 30.87, 30.9, 30.98; 360/99.06, 97.01, 97.02

(56) References Cited

U.S. PATENT DOCUMENTS

| | | | | |
|---|---|---|---|---|
| 4,701,901 A | * | 10/1987 | Imai | 369/75.2 |
| 5,313,351 A | * | 5/1994 | Lee | 360/99.07 |
| 5,633,850 A | * | 5/1997 | Park | 369/77.1 |
| 6,404,725 B2 | * | 6/2002 | Nakamura et al. | 369/191 |
| 6,411,582 B1 | * | 6/2002 | Nakatani et al. | 369/75.2 |

FOREIGN PATENT DOCUMENTS

| | | | | |
|---|---|---|---|---|
| EP | 1 087 386 A1 | * | 4/2000 | G11B/17/04 |
| JP | 62-183081 | * | 8/1987 | G11B/25/04 |
| JP | 62-271245 | * | 11/1987 | G11B/17/04 |
| JP | 01-227284 | * | 9/1989 | G11B/25/04 |
| JP | 06-236607 | * | 9/1994 | G11B/15/675 |
| JP | 7-272417 | | 10/1995 | |
| JP | 10-3722 | | 1/1998 | |
| JP | 11-195262 | | 7/1999 | |

* cited by examiner

Primary Examiner—William Korzuch
Assistant Examiner—Christopher R. Beacham
(74) Attorney, Agent, or Firm—McDermott, Will & Emery

(57) ABSTRACT

A disc player including a drive switching mechanism having an oscillating member provided so as to be capable of oscillating about the same axial position as a transmission gear of the rotation driving source; a switching gear provided on the tip end side of the oscillating member, to be transmissibly connected with the transmission gear; oscillation preventing means for preventing the oscillating member from oscillating during operation of the disc transporting means or the pickup transporting means; an intermediating member for assisting oscillation of the oscillating member while being engaged with the switching gear during the period when the oscillating member lies in its oscillation tracks.

4 Claims, 7 Drawing Sheets

DISC PLAYER

TECHNICAL FIELD

The present invention relates to a disc player for use at the time of playback of a compact disc, and more particularly to a drive switching mechanism of a disc player for conducting switching between disc transporting means and pickup transporting means.

BACKGROUND ART

Conventionally, as such a type of disc player, namely, as a disc player having a configuration in which playback of a disc is conducted after the disc is transported to a predetermined portion by a tray or roller, that disclosed in Japanese Unexamined Patent Publication No. 7-272417 has been known. This type of disc player, as show in FIG. 7, generally comprises: a disc gear train 52 for transporting a disc 51 along an inserting direction A and an ejecting direction B; a driving motor 53 for disc transportation for driving the disc gear train 52; a pickup gear train 55 for transporting an optical pickup 54 along an outward direction C and an inward direction D of the radial direction of the disc; and a driving motor 56 for pickup transportation for driving the pickup gear train 55.

As described above, in the conventional disc player, since driving motors 53, 56 are individually provided for disc transportation and pickup transportation, the number of parts are increased to give rise to increase of the cost, and in addition, it becomes difficult to downsize the entire structure because spaces for installation are required.

Therefore, the present invention has been contrived in view of the above disadvantage, and the object of the present invention is to provide a disc player configured to be capable of reducing the cost, as well as realizing downsizing of the entire structure.

DISCLOSURE OF INVENTION

A disc player according to the present invention comprises: a single rotation driving source having a transmission gear for transmitting a rotation driving force to the outside and capable of rotating in both directions; disc transporting means for transporting a disc along an inserting direction when the rotation driving source rotates in one direction and transporting the disc along an ejecting direction when the rotation driving source rotates in the other direction; pickup transporting means for transporting an optical pickup along an outward direction of the radial direction of the disc when the rotation driving source rotates in one direction and transporting the optical pickup along an inward direction of the radial direction of the disc when the rotation driving source rotates in the other direction; and a drive switching mechanism for switching between the disc transporting means and the pickup transporting means to connect the switched one to the rotation driving source. The drive switching mechanism includes: an oscillating member provided so as to be capable of oscillating about an axial position as same as that of the transmission gear; a switching gear provided on the tip end side of the oscillating member to be transmissible connected with the disc transporting means, while being transmissibly connected to the disc transporting means on one end side of an oscillation track of the oscillating member and being transmissible connected to the pickup transporting means on the other end side of the oscillation track of the oscillating member; oscillation preventing means for preventing oscillation of the oscillating member during operation of either the disc transporting means or the pickup transporting means; and an intermediating member to be engaged with the switching gear to assist oscillation of the oscillating member during when the oscillating member lies in its tracks, the switching gear being configured so as to rotate in the direction of separating from the disc transporting means when the rotation driving source rotates in one direction and to rotate in the direction of separating from the pickup transporting means when the rotation driving source rotates in the other direction, the oscillation preventing means being configured to be engaged with the oscillating member to prevent oscillation of the oscillating member during operation of either the disc transporting means or the pickup transporting means in synchronous with these transporting means.

Employing this configuration makes it possible to drive the disc transporting means and the pickup driving means by a single rotation driving source. In addition, the drive switching mechanism for switching transmission object of the rotation driving source can be configured by such a relatively simple structure comprising the oscillating member oscillating by a driving force of the rotation driving source; the switching gear provided on the tip end side of the oscillating member; the oscillation preventing means; and the intermediating member.

Furthermore, providing the intermediating member allows assure oscillating operation of the oscillating member so that it is possible to switch the transmission object of the rotation driving source with high accuracy. Furthermore, the operation of disconnecting the switching gear transmissibly connected to either the disc transporting means or pickup transporting means to thereby shift to the oscillating operation can be easily and reliably conducted by controlling the direction of rotation of the switching gear. Furthermore, since the oscillating member is rigidly fixed so as not to oscillate during operation of the disc transporting means or the pickup transporting means, transmission of a driving force with respect to these transporting means are secured.

Furthermore, in the above-mentioned improved disc player, the intermediating member is a gear constituting part of an internal gear rotating about an axial position as same as that of the transmission gear. In this case, the oscillating member of which oscillation is assisted by the intermediating member can oscillate and move smoothly and reliably.

Furthermore, in the above-mentioned improved disc player, the intermediating member is supported so as to be movable along the direction of movement of the switching gear. In this case, a shock occurring at the time when the switching gear and the intermediating member are brought into engagement is absorbed by movement of the intermediating member, so that the oscillation of the oscillating member becomes more smooth.

A concrete configuration of the oscillation preventing means is as follows. That is, the oscillation preventing means may be configured by comprising: first and second hook engagement portions provided in the oscillating member; a first hook member oscillatably provided on one side of the oscillation track of the oscillating member; a second hook member oscillatably provided on the other side of the oscillation track of the oscillating member; a slider which starts moving in accordance with reaching of the disc having transported along the inserting direction to a playback position; a first oscillating member engaging portion provided on one end of the first hook member, to be engaged with the first hook to hold the oscillating member in accordance with that the switching gear is transmissibly connected to the disc transporting means; a slider engagement portion provided on the other end of the first hook member, to be engaged with the slider having been moved to cause the first hook member to oscillate in the direction that the first oscillating member engagement portion separates from the first hook engagement portion; a second oscillating member engagement portion provided on one end of the second hook member, to be engaged with the second-hook engagement portion in accordance with that the switching gear is transmissibly connected to the pickup transporting means; a pickup engagement portion provided on the other end of the second hook member, to be engaged with the optical pickup having been moved inwardly in the radial direction of the disc by the pickup transporting means to cause the second hook member to oscillate in the direction that the second oscillating member engagement portion separates from the second hook engagement portion; a first energizing member for energizing oscillation of the first hook member in the direction that the first oscillating member engagement portion comes into engagement with the first hook engagement portion; and a second hook energizing member for energizing oscillation of the second hook member in the direction that the second oscillating member engagement portion comes into engagement with the second hook engagement portion.

BEST MODE FOR CARRYING OUT THE INVENTION

Figure 1:
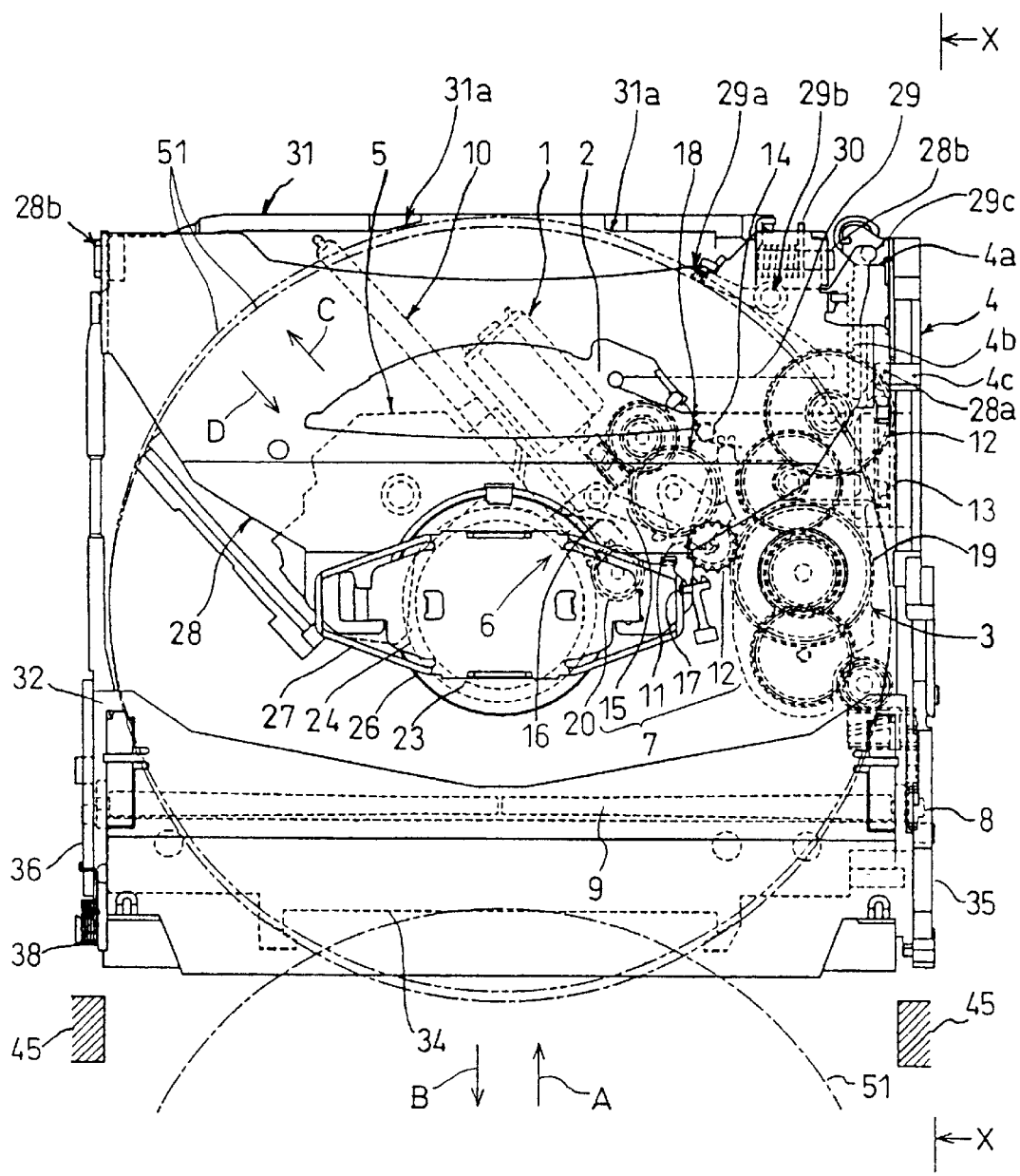
FIG. 1 is a plane view showing an entire structure of a disc player according to an embodiment of the present invention.
Figure 2:
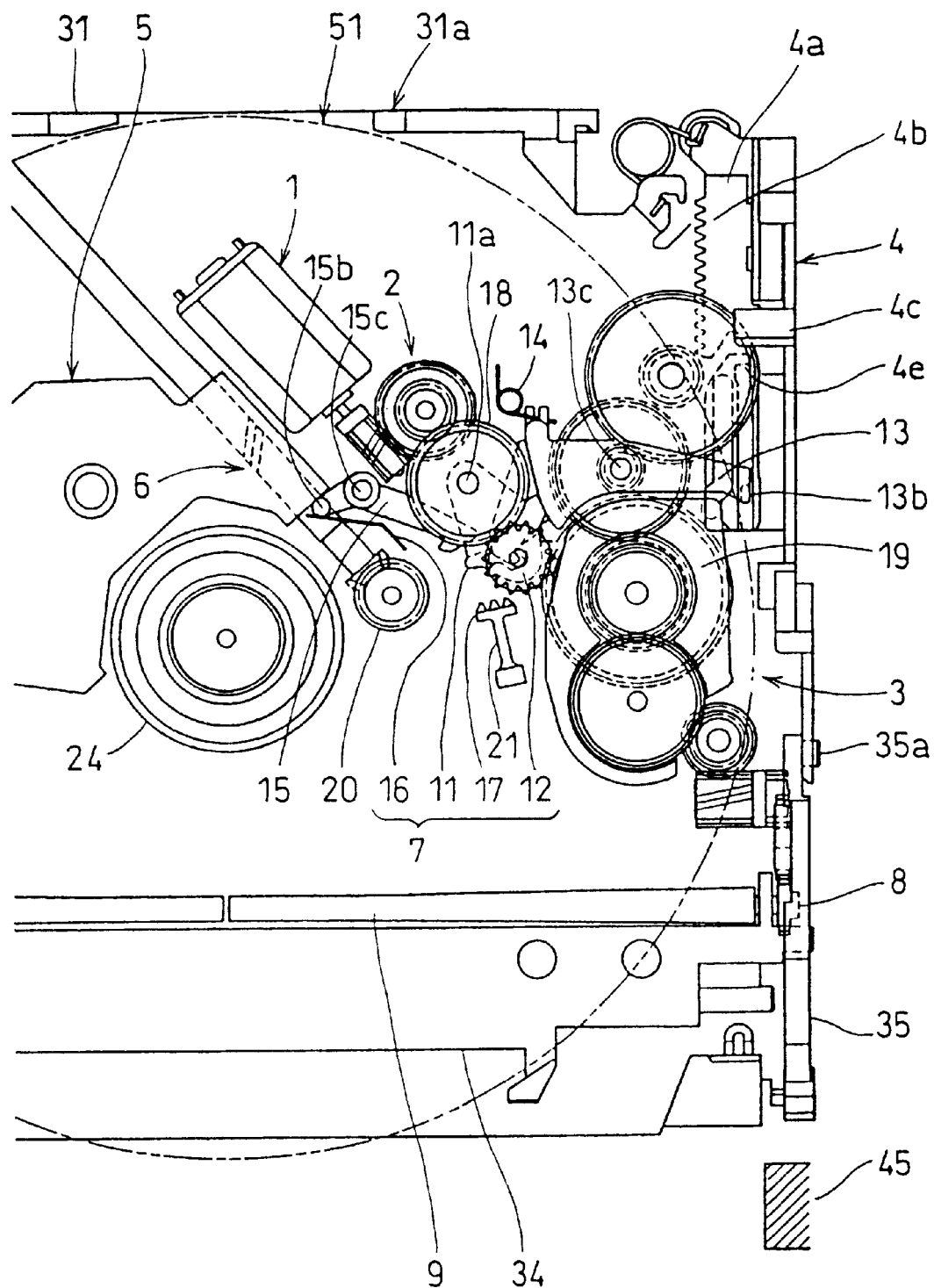
FIG. 2 is a plane view showing an essential structure in the state that a switching gear is situated on the side of a disc gear train in the embodiment.

In the followings, the best embodiment of the present invention will be described in detail with reference to FIGS. 1 to 6, however, the present invention is not limited to a disc player having such use. Likewise FIG. 7 showing the conventional embodiment, the reference numeral 51 in FIGS. 1 to 6 showing the embodiment of the present invention denotes a disc player.

The disc player according to the embodiment of the present invention comprises a driving motor 1, a motor gear train 2, a disc gear train 3, a slider 4, a pickup gear train 6 and a drive switching mechanism 7.

The driving motor 1 is a single motor capable of reciprocal rotating operation. The motor gear train 2 transmits output of the driving motor 1. In the present embodiment, one example of a rotation driving source is consisted of the driving motor 1 and the motor gear train 2. The disc gear train 3 transports the disc 51 along the inserting direction A when the driving motor 1 rotates in one direction, while transporting the disc 51 along the ejecting direction B when the driving motor 1 rotates in the other direction. In the present embodiment, one example of disc transporting means is constituted by the disc gear train 3. The slider 4 is configured so as to start moving along the ejecting direction B of the disc 51 in accordance with that the disc 51 transported along the inserting direction A reaches a playback position. The pickup gear train 6 transports an optical pickup 5 along the outward direction C of the radius of the disc when the driving motor 1 rotates in one direction, while transporting the optical pickup 5 along the inward direction D of the radius of the disc when the driving motor 1 rotates in the other direction. In the present embodiment, one example of pickup transporting means is constituted by the pickup gear train 6. The drive switching mechanism 7 makes the disc gear train 3 and the pickup gear train 6 contact with the motor gear train 2 while alternately switching therebetween.

A roller gear 8 of the disc gear train 3 is integrated into a roller 9 which actually transports the disc 51. The pickup gear train 6 includes a lead screw 10 which actually transports the optical pickup 5.

The reference numeral 23 denotes a spindle motor, the reference numeral 24 denotes a turn table, the reference numeral 26 denotes a clamper, the reference numeral 27 denotes a clamper holding plate, the reference numeral 28 denotes a damper arm, the reference numeral 29 denotes a trigger lever and the reference numeral 30 denotes a damper arm spring. The spindle motor 23 rotates the disc 51 placed on the turn table 24. The damper arm 28 makes the damper 26 to be pressed against the disc 51. The trigger lever 29 causes the slider 4 to start moving by detecting that the disc 51 has reached the playback position. Furthermore, in these drawings, the reference numeral 31 denotes a traverse substrate, the reference numeral 32 denotes a disc guide, the reference numerals 34 denotes a roller arm, the reference numerals 35, 36 denote energizing angles and the reference numeral 37, 38 denote springs for energizing the angles. On one side position of the traverse substrate 31 supporting various kinds of parts and members, the slider 4 is attached so as to be movable. The roller arm 34 supports the roller 9. The energizing angles 35, 36 energizes the roller 9 toward the disc guide 32.

The drive switching mechanism 7 comprises an oscillating member 11, a switching gear 12, a first hook member 13, a torsion spring 14 which is one example of the first energizing member, a second hook member 15, a flat spring 16 which is one example of the second energizing member and an intermediating member 17 for intermediating movement of the switching gear 12.

Figure 3:
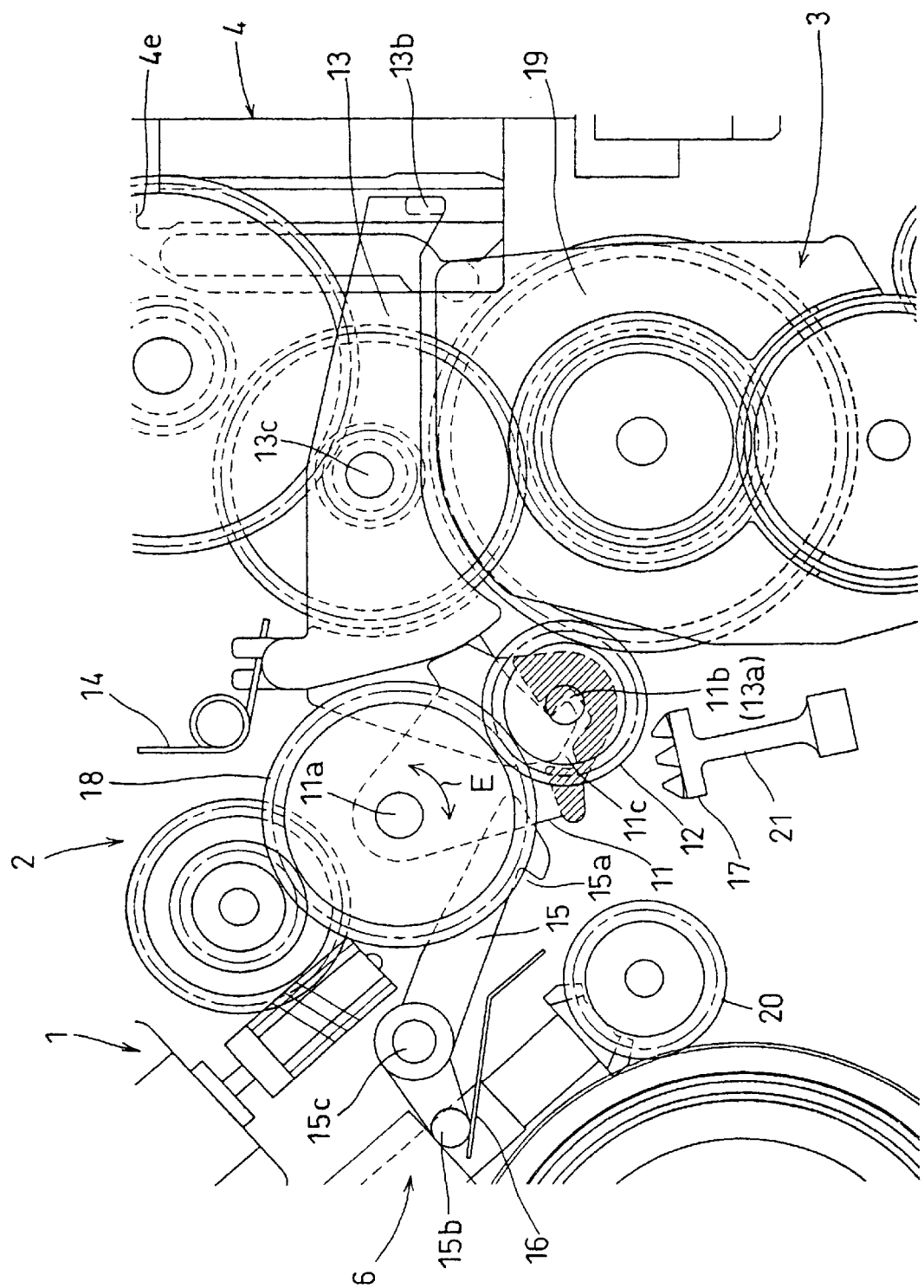
FIG. 3 is an enlarged plane view of the essential structure shown in FIG. 2.
Figure 4:
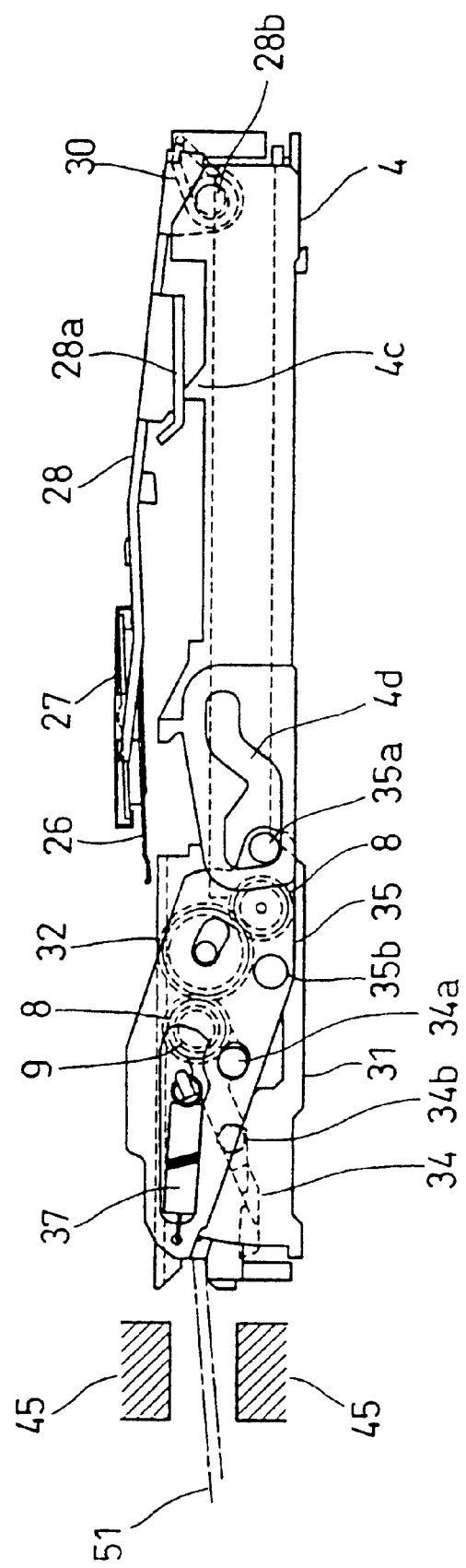
FIG. 4 is a side view of the structure along the line X—X shown in FIG. 2.
Figure 5:
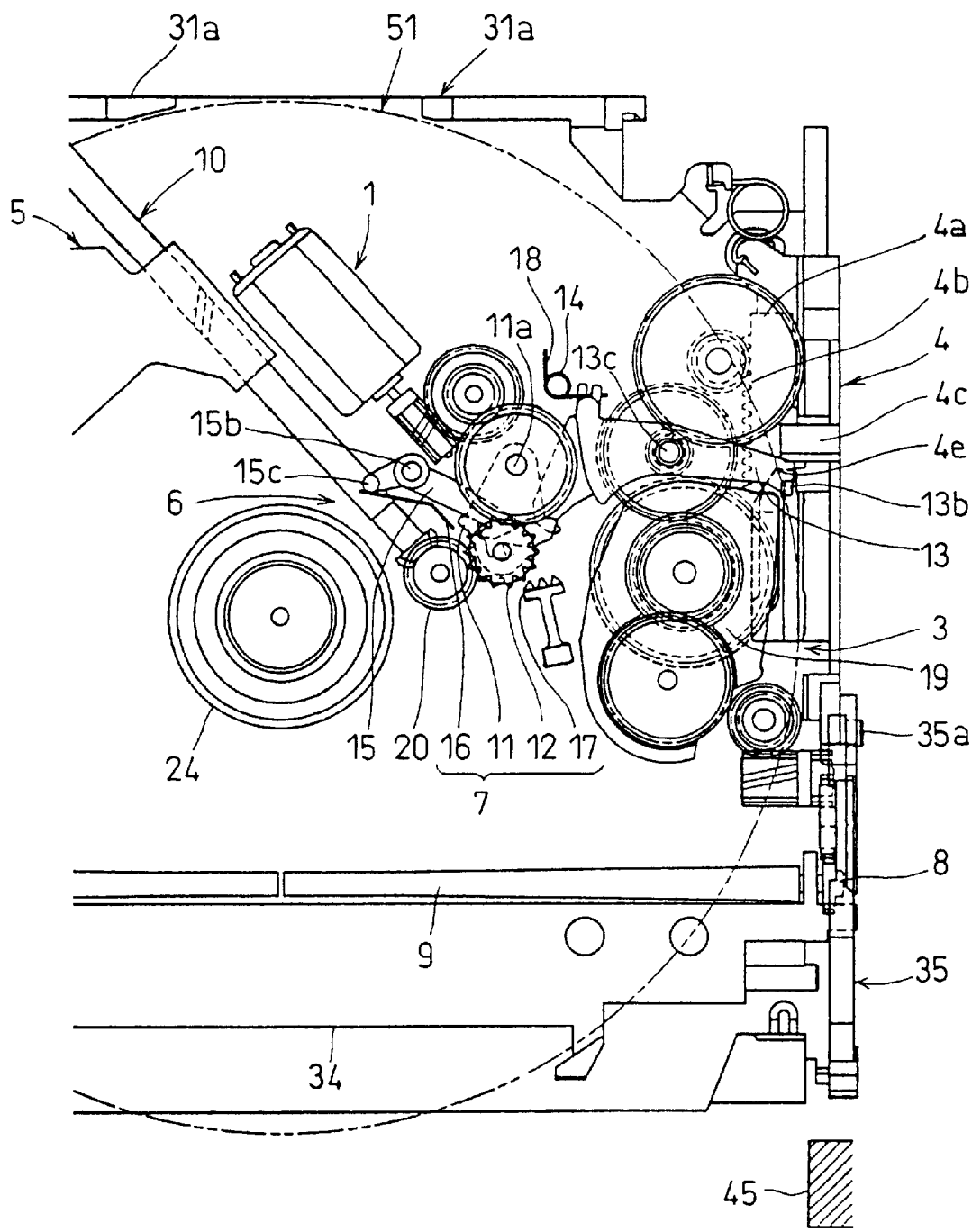
FIG. 5 is a plane view showing an essential structure in the state that the switching gear is situated on the side of a pickup gear train in the embodiment.

As shown in FIG. 3, the oscillating member 11 is formed into an elongated arm shape and provided with an oscillation fulcrum 11a on one end thereof. The oscillation fulcrum 11a is provided in the same axial position as a terminal gear 18 of the motor gear train 2. In the present embodiment, one example of the transmission gear of the rotation-driving source is constituted by the terminal gear 18. The oscillating member 11 is oscillatably journaled about the oscillation fulcrum 11a. On the other end of the oscillating member 11, the switching gear 12 is rotatably journaled. The switching gear 12 is meshed with the terminal gear 18. The oscillating member 11 thus constituted is provided with a first hook engagement portion 11b and a second hook engagement portion 11c. In this context, the reference numeral E in FIGS. 3 and 6 denotes an oscillating direction of the oscillating member 11.

The switching gear 12 moves in accordance with oscillation of the oscillating member 11, and thereafter comes into mesh with predetermined gears 19, 20 constituting either one of the disc gear train 3 and the pickup gear train 6. And, when the driving motor 1 rotates in one direction, the switching gear 12 is located on the side of the disc gear train 3, and meshes with the predetermined gear 19 while rotating along the direction of separating from the disc gear train 3 (the clockwise direction in drawings). On the contrary, when the driving motor 1 rotates in the other direction, the switching gear 12 is located on the side of the pickup gear train 6, and meshes with the predetermined gear 20 while rotating along the direction separating from the pickup gear train 6 (the counterclockwise direction in drawings).

The first hook member 13 is provided on one end side of an oscillation track of the oscillating member 11. To be more specific, the first hook member 13 is provided on one end side along the oscillating direction E of the oscillating member 11. The first hook member 13 is oscillatably journaled via an oscillation fulcrum 13c thereof. The first hook member 13 is provided with a first oscillating member engagement portion 13a on one end thereof, and a slider engagement portion 13b on the other end thereof.

The first oscillating member engagement portion 13a positions and supports the oscillating member 11 while being engaged with the first hook engagement portion 11b, in accordance with that the switching gear 12 meshes with the predetermined gear 19 constituting the disc gear train 3.

The slider engagement portion 13b engages with the moving slider 4, thereby allowing oscillation of the first hook member 13. The direction of oscillation at this time is the direction in which the first oscillating member engagement portion 13a separates from the first hook engagement portion 11b. The torsion spring 14 energizes oscillation of the first hook member 13, and this energizing of oscillation of the torsion spring 14 allows the first oscillating member engagement portion 13a to engage with the first hook engagement portion 11b.

The second hook member 15 is provided on the other end side of the oscillation track of the oscillating member 11. To be more specific, the second hook member 15 is provided on the other end side along the oscillating direction E of the oscillating member 11. The second hook member 15 is oscillatably journaled via an oscillation fulcrum 15c thereof. The second hook member 15 is provided with a second oscillating member engagement portion 15a on one end thereof, and a pickup engagement portion 15b on the other end thereof.

The second oscillating member engagement portion 15a positions and supports the oscillating member 11 while being engaged with the second hook engagement portion 11c, in accordance with that the switching gear 12 meshes with the predetermined gear 20 constituting the pickup gear train 6.

The pickup engagement portion 15b engages with the pickup 5 which moves in the inward direction D of the radius of the disc, thereby allowing oscillation of the second hook member 15. The direction of oscillation at this time is the direction in which the second oscillating member engagement portion 15a separates from the second hook engagement portion 11c. The flat spring 16 energizes oscillation of the second hook member 15, and this energizing of oscillation of the flat spring 16 allows the second oscillating member engagement portion 15a to engage with the second hook engagement portion 11c.

The intermediating member 17 is disposed between the disc gear train 3 and the pickup gear train 6 as positioning means. The intermediating member 17 is formed into a partial gear shape. To be more specific, the intermediating member 17 constitutes part of an internal gear rotating about the same axial position as the terminal gear 18 of the motor gear train 2. The internal gear is not fully shown in drawings.

The intermediating member 17 performs operations as follows. That is, the intermediating member 17 performs operation of intermediating movement of the switching gear 12 in the position directly before meshing with either one of the gears 19, 20 to reach the position where the switching gear 12 meshes with the other of the gears 20, 19. In this context, since the intermediating member 17 is formed into a gear shape, the switching gear 12 still meshing with the terminal gear 18 will be reliably moved toward the disc gear train 3 side or the pickup gear train 6 side while being meshed with the intermediating member 17.

Incidentally, in accordance with movement of the switching gear 12, an external force along the movement direction can act on the intermediating member 17. In such a case, by oscillatably supporting the intermediating member 17 with a supporting member 21 formed of an elastic material, it is possible to absorb such an external force. Furthermore, the intermediating member 17 itself may be formed of an elastic resin material such as rubber and sponge. Also in the case of employing the above configurations, movement of the switching gear 12 is assured by mesh of gears occurring between the switching gear 12 and the intermediating member 17.

Next, operation of the disc player according to the present embodiment will be described.

At first, upon insertion of the disc 51 from an insertion opening 45, a photo sensor (omitted in drawings) detects the insertion of the disc 51, and based on the detection result, the driving motor 1 is caused to rotate in one direction. Output of this driving motor 1 is transmitted to the switching gear 12 via the motor gear train 2, as well as transmitted from the switching gear 12 rotating along the counterclockwise direction in FIG. 3 to the disc gear train 3 via the gear 19. In response to this, the roller 9 integrated into the roller gear 8 of the disc gear train 3 rotates in one direction along the clockwise direction in FIG. 4, resulting that the disc 51 is inserted into the interior. At this time, the roller 9 is preliminarily energized in the direction of the disc guide 32 (upward direction of the disc player) by the energizing angles 35, 36 and the springs 37, 38. Accordingly, the disc 51 is inserted up to the playback position while being pressed against the disc guide 32 in accordance with rotation of the roller 9. Then, the disc 51 having been inserted up to the playback position pushes a first disc abutment portion 29a provided on the trigger lever 29 in the inserting direction A of the disc 51.

As the first disc abutment portion 29a is pushed, the trigger lever 29 rotates about its rotation fulcrum 29b along the clockwise direction in FIG. 1. As a result of this, a slider operation portion 29c provided at the tip end of the trigger lever 29 pushes an engagement portion 4a of the slider 4 until the disc 51 comes into abutment with a disc engagement member 31a provided on the traverse substrate 31 to thereby stop. As a result of this, a rack portion 4b of the slider 4 meshes with either one of the gears constituting the disc gear train 3, and moves along the ejecting direction B of the disc 51 while keeping meshing state. Accordingly, a supporting portion 4c of the slider 4 separates from a supporting portion 28a of the damper arm 28, resulting that the damper arm 28 under the action of the damper arm spring 30 rotates about a rotation fulcrum 28b in the downward direction of the disc player, and hence the damper 26 presses the disc 51 against the turn table 24.

As the slider 4 further moves, an engagement pin 35a of the energizing angle 35 which meshes with a cam portion 4d of the slider 4 is operated. As a result of this, the energizing angle 35 rotates about a rotation fulcrum 35b along the counterclockwise direction in FIG. 4. As a result of this, an engagement pin 34a of the roller arm 34 which meshes with the energizing angle 35 is operated. As a result of this, the roller moves in the direction of separating from the disc 51, and the disc 51 after the roller 9 has separated therefrom also separates from the disc guide 32 to be rotatably placed on the turn table 24.

Furthermore, by an operation portion 4e of the slider 4 having moved, the slider engagement portion 13b of the first hook member 13 is pushed along the ejecting direction B of the disc 51, and the first hook member 13 oscillates about the oscillation fulcrum 13c along the clockwise direction in FIG. 3.

As a result of this, the first oscillating member engagement portion 13a having positioned and supported the oscillating member 11 while being engaged with the first hook engagement portion 11b comes off the first hook engagement portion 11b. As a result of this, the oscillating member 11 having oscillated to the disc gear train 3 side oscillates in the direction that the switching gear 12 rotating along the counterclockwise direction in FIG. 3 separates from the disc gear train 3 under the action of the reaction for rotating the gear 19 of the disc gear train 3. At this time, the switching gear 12, together with the oscillating member 11, starts movement along the clockwise direction in FIG. 3, namely, movement of the leftward direction.

Then as the switching gear 12 moves leftward to reach the position directly before the position where the switching gear 12 no longer meshes with the gear 19, the switching gear 12 comes into mesh with the intermediating member 17 and further moves leftward in FIG. 3 while being movably supported by the intermediating member 17. And then the switching gear 12 begins meshing with the gear 20. At this time, since the switching gear 12 continues rotating along the counterclockwise direction in FIG. 3, the switching gear 12 meshes with the gear 20 more deeply and comes off the intermediating member 17 (See FIGS. 5 and 6).

As a result of this, output of the driving motor 1 which is rotating in one direction is transmitted to the pickup gear train 6 via the switching gear 12, and the optical pickup 5 is moved in the outward direction of the radius of the disc by the lead screw 10 of the pickup gear train 6.

As the optical pickup 5 moves in the outward direction of the radius of the disc, the following operation occurs. That is, the second hook member 15 having been displaced against energizing of the flat sprint 16 by engagement between the pickup engagement portion 15b and the optical pickup 5 oscillates along the clockwise direction in FIG. 6 by an energizing force of the flat spring 16. As a result of this, the second oscillating member engagement portion 15a engages with the second hook engagement portion 11c, and the oscillating member 11 is positioned and supported by the second hook member 15.

In this state, the driving motor 1 is reciprocally rotated to thereby transport the optical pickup 5 in the outward and inward directions of the radius of the disc, and read out and play back signal information from the disc 51.

Figure 6:
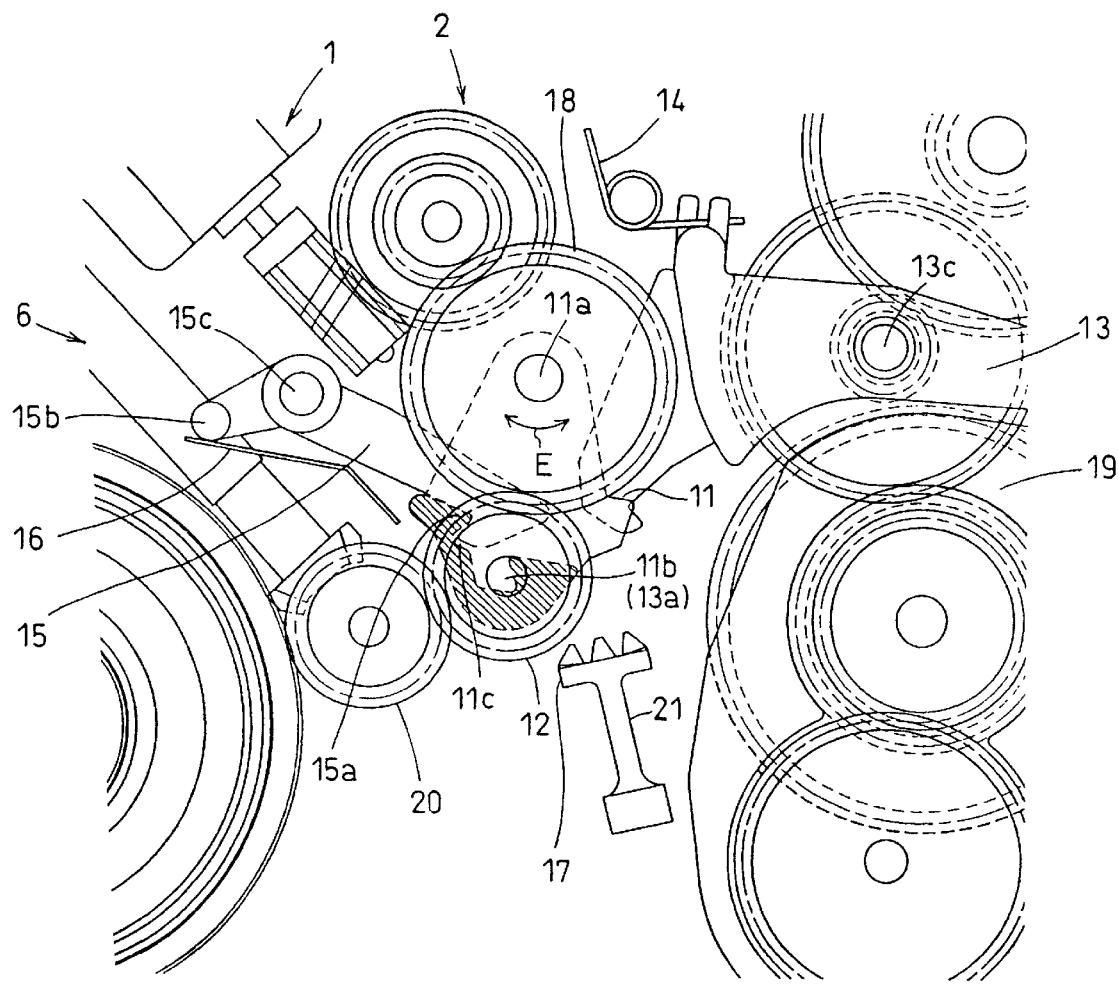
FIG. 6 is an enlarged plane view of the essential structure shown in FIG. 5.
Figure 7:
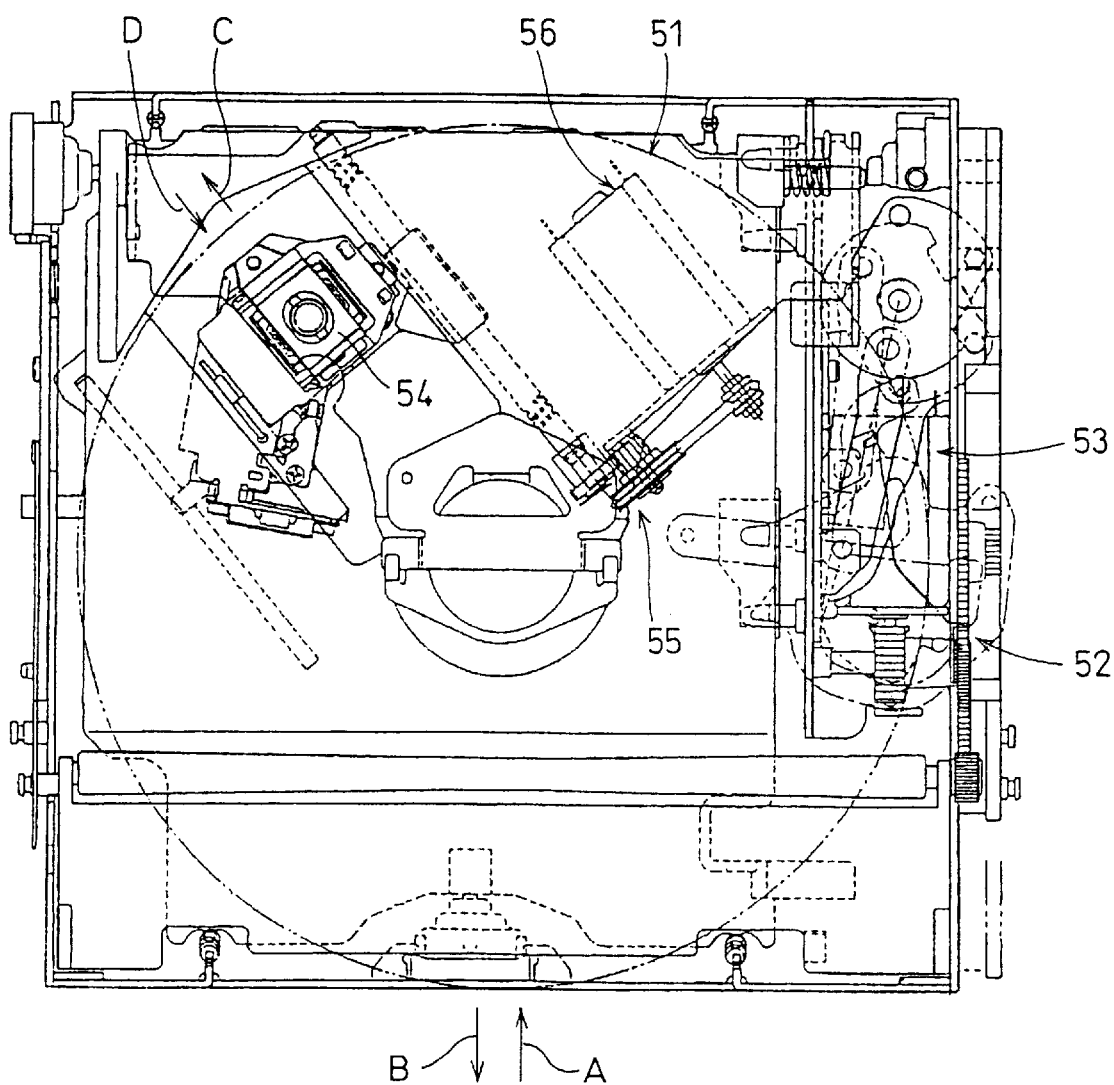
FIG. 7 is a plane view showing an entire structure of a disc player according to a conventional embodiment.

On the other hand, when the driving motor 1 is caused to rotate in the other direction (at the end of playback, for example) on the basis of the signal information read out from the disc 51 and indication from a detection switch (omitted in the drawing), the switching gear 12 rotates in the clockwise direction in FIG. 6 via the motor gear train 2. As a result of this, the optical pickup 5 having received the rotation driving via the pickup gear train 6 moves in the inward direction of the radius of the disc to push the pickup engagement portion 15b of the second hook member 15. Accordingly, the second hook member 15 oscillates against the flat spring 16 along the counterclockwise direction in FIG. 6.

As a result of this, the second oscillating member engagement portion 15a having positioned and supported the oscillating member 11 while being engaged with the second hook engagement portion 11c comes off the second hook engagement portion 11c. As a result of this, the switching gear 12 (at this time, the switching gear 12 is rotating along the clockwise direction) receives a reaction which occurs at the time when the pickup gear train 6 causes the gear 20 to rotate, resulting that the oscillating member 11 oscillates in the direction of separating from the pickup gear train 6. At this time, the switching gear 12, together with the oscillating member 11, starts movement along the counterclockwise direction in FIG. 6, namely, movement of the rightward direction.

Then as the switching gear 12 moves rightward to reach the position directly before the position where the switching gear 12 no longer meshes with the gear 20, the switching gear 12 comes into mesh with the intermediating member 17 and further moves rightward in FIG. 6 while being movably supported by the intermediating member 17. And then the switching gear 12 begins meshing with the gear 19. At this time, since the switching gear 12 continues rotating along the clockwise direction in FIG. 6, the switching gear 12 meshes with the gear 19 more deeply and comes off the intermediating member 17.

As a result of this, output from the driving motor 1 which is rotating in the other direction is transmitted to the disc gear train 3 via the switching gear 12, and the slider 4 of which rack portion 4b is meshed with one of the gears constituting the disc gear train 3 moves along the inserting direction A of the disc 51.

As a result of this, the operation portion 4e of the slider 4 separates from the second oscillating member engagement portion 13b, and the first hook member 13 oscillates along the counterclockwise direction in FIG. 3 by the energizing force of the torsion sprint 14. As a result of this, the first oscillating member engagement portion 13a comes into engagement with the first hook engagement portion 11a, and the oscillating member 11 is positioned and supported by the first hook member 13. Accordingly, output from the driving motor 1 which is rotating in the other direction is transmitted to the disc gear train 3 in a stable manner via the motor gear train 2 and the switching gear 12.

Furthermore, if the slider 4 continues moving, reverse operation to that explained for disc insertion is executed, with the result that the roller 9 presses the disc 51 against the disc guide 32. Moreover, the damper arm 28 is pushed up in the upward direction of the disc player. Under this condition, the roller 9 rotates in the other direction along the counterclockwise direction in FIG. 4, with the result that the disc 51 is ejected outside the apparatus.

Incidentally, under such a condition, by making the driving motor 1 rotate in one direction, it is also possible to insert the disc 51 again. This is because the oscillating member 11 is positioned and supported by the first hook member 13 by the rotation operation in on direction, and the disc gear train 3 and the switching gear 12 meshes with each other.

INDUSTRIAL APPLICABILITY

According to the present invention, since the rotation driving source is commonly used by the disc transporting means and the pickup transporting means, and the disc and the optical pickup are transported by the single rotation driving source, it is possible to reduce the costs, as well as to realize downsizing of the entire structure. Furthermore, in the present invention, movement of the oscillating member and the switching gear of the drive switching mechanism is reliably secured by the intermediating member, and a friction mechanism which is commonly used is not used, with the result that an advantage is secured that enables reduction of current drain of the driving motor at the time of disc transportation and pickup movement, and suppression of heating of the disc player.

What is claimed is:

1. A disc player comprising:

a single rotation driving source having a transmission gear for transmitting a rotation driving force to the outside and capable of rotating in both directions;

disc transporting means for transporting a disc along an inserting direction when said rotation driving source rotates in one direction and transporting the disc along an ejecting direction when said rotation driving source rotates in the other direction;

pickup transporting means for transporting an optical pickup along an outward direction of the radial direction of the disc when said rotation driving source rotates in one direction and transporting the optical pickup along an inward direction of the radial direction of the disc when said rotation driving source rotates in the other direction; and a drive switching mechanism for switching between said disc transporting means and said pickup transporting means to connect the switched one to said rotation driving source, said drive switching mechanism having:

an oscillating member provided so as to be capable of oscillating with an axial position the same as that of said transmission gear being the center of oscillation;

a switching gear provided on the tip end side of said oscillating member to be transmissibly connected with said disc transporting means, while being transmissibly connected to said disc transporting means on one end side of an oscillation track of said oscillating member and being transmissibly connected to said pickup transporting means on the other end side of the oscillation track of said oscillating member;

oscillation preventing means for preventing oscillation of said oscillating member during operation of either said disc transporting means or said pickup transporting means; and an intermediating member to be engaged with said switching gear to assist oscillation of said oscillating member during when said oscillating member lies in its tracks, said switching gear being configured so as to rotate in the direction of separating from the disc transporting means when said rotation driving source rotates in one direction and to rotate in the direction of separating from the pickup transporting means when said rotation driving source rotates in the other direction, said oscillation preventing means being configured to be engaged with the oscillating member to prevent oscillation of said oscillating member during operation of either said disc transporting means or said pickup transporting means in synchronous with these transporting means.

2. The disc player according to claim 1, wherein said intermediating member is a gear constituting part of an internal gear rotating about an axial position as same as that of said transmission gear.

3. The disc player according to claim 2, wherein said intermediating member is supported so as to be movable along the direction of movement of the switching gear.

4. The disc player according to claim 1, wherein said oscillation preventing means comprises:

first and second hook engagement portions provided in said oscillating member;

a first hook member oscillatably provided on one side of the oscillation track of said oscillating member;

a second hook member oscillatably provided on the other side of the oscillation track of said oscillating member;

a slider which starts moving in accordance with reaching of the disc having transported along the inserting direction to a playback position;

a first oscillating member engaging portion provided on one end of said first hook member, to be engaged with said first hook to hold said oscillating member in accordance with that said switching gear is transmissibly connected to the disc transporting means;

a slider engagement portion provided on the other end of said first hook member, to be engaged with said slider having been moved to cause said first hook member to oscillate in the direction that said first oscillating member engagement portion separates from said first hook engagement portion;

a second oscillating member engagement portion provided on one end of said second hook member, to be engaged with said second hook engagement portion in accordance with that said switching gear is transmissibly connected to the pickup transporting means;

a pickup engagement portion provided on the other end of said second hook member, to be engaged with said optical pickup having been moved inwardly in the radial direction of the disc by said pickup transporting means to cause said second hook member to oscillate in the direction that said second oscillating member engagement portion separates from said second hook engagement portion;

a first energizing member for energizing oscillation of said first hook member in the direction that said first oscillating member engagement portion comes into engagement with said first hook engagement portion; and a second hook energizing member for energizing oscillation of said second hook member in the direction that said second oscillating member engagement portion comes into engagement with said second hook engagement portion.

* * * * *